(12) United States Patent
Hansen

(10) Patent No.: US 9,944,447 B2
(45) Date of Patent: Apr. 17, 2018

(54) VALVE DEVICE FOR A PACKAGING CONFIGURED TO HOLD A PRODUCT RELEASING A GAS

(71) Applicant: AMCOR FLEXIBLES DENMARK A/S, Horsens (DK)

(72) Inventor: Peter Hansen, Vejle Øst (DK)

(73) Assignee: Amcor Flexibles Denmark A/S, Horsens (DK)

( * ) Notice: Subject to any disclaimer, the term of this patent is extended or adjusted under 35 U.S.C. 154(b) by 129 days.

(21) Appl. No.: 14/903,737

(22) PCT Filed: Jul. 10, 2014

(86) PCT No.: PCT/EP2014/064788
§ 371 (c)(1),
(2) Date: Jan. 8, 2016

(87) PCT Pub. No.: WO2015/004221
PCT Pub. Date: Jan. 15, 2015

(65) Prior Publication Data
US 2016/0185501 A1 Jun. 30, 2016

(30) Foreign Application Priority Data
Jul. 10, 2013 (EP) .................................... 13175844

(51) Int. Cl.
*B65D 77/22* (2006.01)
*B65D 79/00* (2006.01)
*F16K 15/14* (2006.01)

(52) U.S. Cl.
CPC ......... *B65D 77/225* (2013.01); *B65D 79/005* (2013.01); *F16K 15/147* (2013.01);
(Continued)

(58) Field of Classification Search
CPC .......................... B65D 77/225; B65D 2205/00; B65D 79/005; Y10T 137/4358; Y10T 137/4486;
(Continued)

(56) References Cited

U.S. PATENT DOCUMENTS 4,134,535 A * 1/1979 Barthels ............... B65D 77/225
137/251.1
4,890,637 A * 1/1990 Lamparter ........... B65D 77/225
137/246
(Continued)

FOREIGN PATENT DOCUMENTS

EP 2272661 A1 1/2011
WO 2006012282 A1 2/2006

OTHER PUBLICATIONS

EPO, Written Opinion of the International Searching Authority for International Application No. PCT/EP2014/064788, dated Sep. 29, 2014, 5 pages.
(Continued)

*Primary Examiner* — Matthew W Jellett
(74) *Attorney, Agent, or Firm* — Barclay Damon, LLP

(57) ABSTRACT

A valve device for a packaging configured to hold a product releasing a gas. The valve device comprises, in an embodiment, a first inner film provided with a first opening and a second outer film covering the first opening. Between the first inner and the second outer film a first chamber is provided. The first opening provides a gas communication between the first chamber and the interior of the packaging. The first and second films define a channel being in fluid communication with the first chamber. Further, the valve device comprises a second chamber, and the channel connects the first and second chamber. The second chamber comprises a second opening being in fluid communication with the exterior of the packaging. At least one of the first and second chambers comprises a liquid and at least one spacer.

20 Claims, 3 Drawing Sheets

Figure 1:
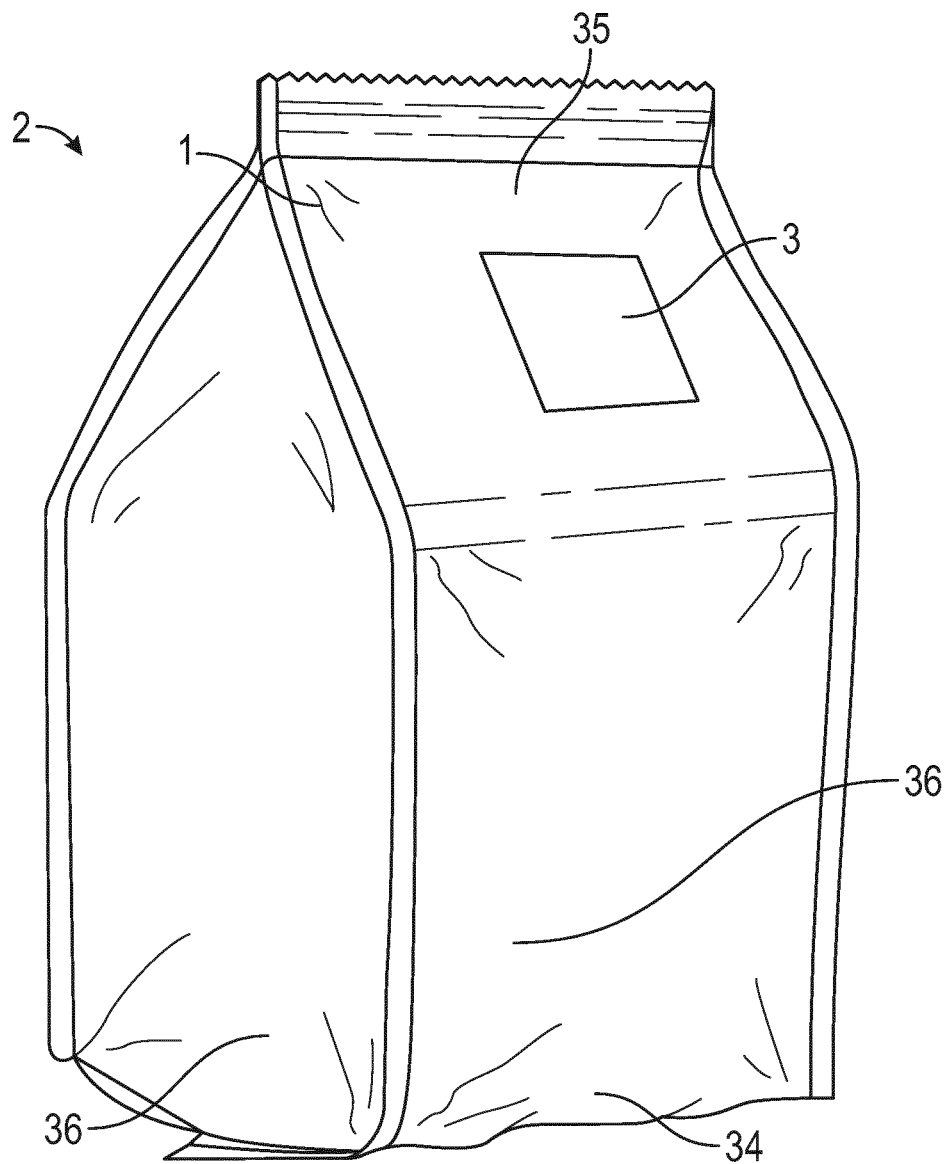

(52) U.S. Cl.
CPC ..... *B65D 2205/00* (2013.01); *Y10T 137/7843* (2015.04); *Y10T 137/7882* (2015.04)

(58) Field of Classification Search
CPC ........... Y10T 137/784; Y10T 137/7843; Y10T 137/7895; Y10T 137/7882; Y10T 137/88054; F16K 15/147
USPC ..................... 137/246, 859, 512.15; 426/118
See application file for complete search history.

(56) References Cited

U.S. PATENT DOCUMENTS

| | | | | |
|---|---|---|---|---|
| 5,584,409 | A * | 12/1996 | Chemberlen | B65D 77/225 220/373 |
| 6,662,827 | B1 * | 12/2003 | Clougherty | B65D 77/225 137/859 |
| 6,663,284 | B2 * | 12/2003 | Buckingham | F16K 15/144 220/203.15 |
| 7,490,623 | B2 * | 2/2009 | Rypstra | B65D 77/225 137/246 |
| 7,527,840 | B2 | 5/2009 | Zeik | |
| 7,685,793 | B2 * | 3/2010 | Newrones | B65D 33/2508 137/907 |
| 8,530,031 | B2 * | 9/2013 | Newrones | B31D 1/026 156/249 |
| 8,557,357 | B2 * | 10/2013 | Lykke | B32B 3/08 428/137 |
| 8,667,768 | B2 * | 3/2014 | Newrones | B65D 33/2508 137/246.16 |

OTHER PUBLICATIONS

EPO, International Search Report for International Application No. PCT/EP2014/064788, dated Sep. 29, 2014, 5 pages.

* cited by examiner

VALVE DEVICE FOR A PACKAGING CONFIGURED TO HOLD A PRODUCT RELEASING A GAS

CROSS-REFERENCE TO RELATED APPLICATIONS

This application is a national stage application pursuant to 35 U.S.C. § 371 of International Application No. PCT/EP2014/064788, filed on Jul. 10, 2014, which claims priority to, and the benefit of, European Patent Application No. 13175844.3, filed on Jul. 10, 2013. The entire contents of such applications are hereby incorporated by reference.

TECHNICAL FIELD

The invention relates to a packaging material for forming a packaging for a product releasing gasses, said packaging material comprising an integrated pressure release valve and comprising a first inner film provided with a first opening and a second outer film covering the first opening, a first chamber being provided between the first inner film and the second outer film comprising the first opening, said first opening providing a gas communication between the first chamber and the interior of the packaging, said first and second films delimiting a channel being in fluid communication with the first chamber.

BACKGROUND

One-way gas release valves for maintaining freshness of coffee is known. The valves allow gas pressure within the container to escape, when the pressure is higher than the pressure of the ambient air. However, the holes allowing the valve to function often lead to granulate such as coffee grinds migrating through the venting hole, whereby the valve is rendered ineffective to close against the ambient air.

U.S. Pat. No. 7,527,840 discloses a laminate and a container comprising an integrated pressure release valve. The valve comprises a chamber communicating with the interior of a container through openings provided in a first laminate. A channel is placed between the chamber and an opening provided in a second laminate covering, the chamber and the channel. In the channel, an oil comprising particles is placed. When a pressure arises inside the container, the gas will escape through the first opening, through the first chamber and the channel and out into the atmosphere through the outlet opening. In order to work properly, the opening pressure is high. This has the disadvantage that the containers will balloon before the gas escapes from the containers.

DISCLOSURE OF THE INVENTION

An aspect of the invention is to provide a packaging material that overcomes at least one of the disadvantages of the prior art or provides at least a useful alternative.

According to a first aspect of the invention, a packaging material as described in the introduction is provided where the packaging material further comprises a second chamber, said channel connecting the first and the second chambers, said second chamber being delimited by the first and second films and comprising a second opening being in fluid communication with the exterior of the packaging allowing a fluid communication of gasses which enters the first chamber via the first opening to exit the first chamber and enters the second chamber via the channel, to be expelled from the packaging material via the second opening and at least one of the first or second chambers comprising a liquid, and at least one of the first or second chambers comprising spacer means.

In accordance with the invention, the first opening, the first chamber, the channel, the second chamber and the second opening may define the one way valve of the packaging material.

By arranging the valve in such a manner where a fluid communication of gasses which enters the first chamber via the first opening to exit the first chamber and enters the second chamber via the channel, to be expelled from the packaging material via the second opening it is ensured that the gasses follow a certain fluid communication path between the first opening and the second opening, ensuring that the gasses pass certain parts of the packaging material in order to ensure that the structure and/or the contents of the first chamber, channel or second chamber can control the release of the gasses, as the structure defines a valve.

When a pressure arises in the packaging, the gas will escape through the first opening into the first chamber. The liquid is present in the channel due to the flow of the liquid after it has been applied. If liquid is present in the first chamber, the pressure will press the liquid in the first chamber into the channel and further into the second chamber. Then, the gas bobbles through the liquid in the second chamber and leaves the second chamber through the second opening, whereby the pressure difference between the interior of the packaging and the ambient air is equalized. The liquid may be placed in the second chamber from the beginning or be pressed from the first chamber through the channel and into the second chamber, where the gas is released, or the liquid may only be placed in the second chamber. The liquid may also be placed in both chambers from the beginning that is during the manufacturing of the packaging material with the integrated valve. Afterwards some of the liquid will flow into the channel.

Now, the liquid runs back into the channel and thereby closes the channel and the one-way valve. Thereby, the outside air is prevented from entering the interior of the packaging. The spacer means ensures that the fluid is able to flow, and that the two sheets do not collapse, thereby preventing the flow of the fluid. The two films are spaced apart. The spacer means may be particles placed in the first and the second chamber, or it may be protrusions integrated in one or both films.

Advantageously, the spacer means is placed at least in the second chambers.

Advantageously, the liquid is oil and in order to ease the production of the packaging, the liquid may be mixed with suitable particles and placed in both chambers.

The liquid ensures that the valve is closed when the excessive pressure inside the packaging has been offset, and the spacer means/particles ensures/ensure that the valve is able to reopen by a small excess opening pressure such as 2-6 mbar.

Advantageously, the liquid is silicon oil containing the small particles. The particles keep the inner and outer films spaced slightly apart, while the silicon oil prevents an open two-way-gas-connection between the first opening and the second opening.

One way of forming the chambers and the channel is by applying a print of suitable adhesive designing the two chambers and the channel. Advantageously, the chambers are shaped as square/rectangular areas, and the channel may be a V-shaped channel, the lower part of the V-shaped channel being placed below the bottom of the chambers nearest the bottom of the packaging. Then, the liquid containing the particles is placed in the first and the second chambers, and the second film covering at least the adhesive area is placed over the area, whereby the closed chambers and the closed channel are formed.

The valve is able to release pressure by low values, eg down to 2-6 mbar. This makes the valve very useful as ballooning of the packaging is avoided during degassing.

By "bottom of the packaging" is to understand the part of the packaging resting at a base surface. The bottom part is placed opposite the top of the packaging.

By the term "gas" is to understand a state not being plasma, liquid or solid. It includes introduced gasses and gasses produced by products placed in the packaging.

By "packaging" is to understand items used to contain, store and transport products, such as bottles, containers, boxes, bags and pouches.

The packaging may be formed in various materials of plastic or polymer and contains metallic layers when appropriate. The films mentioned may be laminates selected from the groups consisting of polyolefin, polyamides, polyesters, polycarbonates or combination thereof.

Advantageously, the valve functions independently from the material properties. It functions due to the construction as such and the different features as claimed.

According to another aspect of the invention, the first chamber comprises a first bottom part, said bottom part being closest to a bottom of the packaging compared to the rest of the first chamber, and in that the second chamber comprises a second bottom part, said second bottom part being closest to the bottom of the packaging compared to the rest of the second chamber, the channel connecting the two bottom parts.

Thereby, the liquid is closing an inlet or an outlet of the channel or both when the packaging is placed in a proper position, eg when the bottom of the packaging is resting on a surface.

According to another aspect of the invention, the spacer means comprise particles, said particles being mixed in the liquid or said particles being a separate means placed at least in one of the chambers.

The easiest way of forming the space between the two films is to mix the liquid with particles of a certain size, whereby it is avoided that the two films adhere to each other, thereby preventing the liquid and/or gas to flow through the one-way valve. However, the particles may also be placed in a separate manufacturing step independent from the step for placing the liquid.

According to another aspect of the invention, the channel comprises a channel part being placed in an area between the bottom of the packaging and the second bottom part, said channel part being placed closer to the bottom of the packaging compared to the placement of the first and second bottom part.

Thereby, it is ensured that the liquid runs back into the channel after the pressure alignment has taken place. In this way, the closing pressure properties of the valve are increased.

According to another aspect of the invention, the liquid comprises a fluid selected from the group consisting of oil, water or mixtures thereof or other liquids accepted for being in contact with food.

According to another aspect of the invention, the particles comprise particles selected from the group consisting of powdered polymer such as polyamide, polyester, silicone or combinations thereof or mineral particles such as silica, carbon, carbon black or mixtures thereof, the size of the particle being around 10-100 µm, preferably 40-80 µm.

According to another aspect of the invention, the channel comprises at least one recess extending at least in the entire length of the channel, said recess/recesses comprising a bottom wall, an oppositely placed top wall comprising the second film and side walls delimiting the recess.

By this arrangement, the gas can flow freely. Advantageously, the recess is made by a laser beam. This has the advantages that the recess is placed very precisely in the channel area and further, that bulbs are formed at both sides of the channel by the melting that takes place. The depth of the recess is considerable deeper than the depth of the channel. The depth of the channel is the same as the depth of the chambers. Further their might be several recesses placed in the channel and placed next to each other.

According to another aspect of the invention, the recess/recesses at the top is/are delimited by longitudinal bulbs running at both sides of the recess/recesses with the top of the longitudinal bulbs being placed at a distance from and above the surface of the first film.

The bulb is formed during manufacturing of the recess. A laser beam cuts the recess, whereby the material melts and forms the longitudinal bulbs at both sides of the recess or recesses. The bulbs support the function of the recess, eg ensuring the flow of the gas through the channel. The particles in the chambers may be replaced by protrusions/a bulb made by a laser beam if this is an advantage during the manufacturing of the valve. The distance from the bottom of the recess to the top of the bulb is 20-100 µm, preferably 20-60 µm. The width between the opposite side walls of one recess is 150-300 µm.

According to another aspect of the invention, the recess/recesses is/are provided between the first opening and the second opening, with the gas being able to flow through said recess/recesses.

According to another aspect of the invention, the first film comprises an essentially gas-impervious layer such as a metallisation layer or an EVOH layer.

According to another aspect of the invention, the second film comprises an essentially gas-impervious layer such as a metallisation layer or an EVOH layer, said second film being a separate part adhered to the outer surface of the packaging in the area where the valve is adapted to be provided.

In this case, the second film is a small part of around 2-6 cm² being adhered to the surface of the packaging/the first film by using a proper adhesive. The adhesive pattern forms the two chambers and the channel. The perimeters of the chambers and the channel are completely coated with the adhesive except for the outlet opening placed in the second chamber. Advantageously, the second opening is a gap between the second film and the first inner film placed in the perimeter of the second film. However, it may never be placed in the second bottom part. The second film may also be transparent or comprising a print.

According to another aspect of the invention, the second film comprises an essentially gas-impervious layer, said second film being an integrated part of the packaging material.

According to another aspect of the invention, the second opening of the second chamber is placed above an outlet of the channel, said channel being the area where the channel connects to the second chamber.

Thereby, it is avoided that liquid runs out of the valve when the packaging is placed in its proper position, eg placed with the bottom of the packaging resting at a surface. The opening is not placed in a direction pointing towards the bottom of the packaging.

According to another aspect of the invention, both chambers comprise liquid mixed with particles.

Advantageously, the liquid is oil.

According to another aspect of the invention, both chambers comprise particles and/or integrated protrusions, whereby a certain distance is provided between the first and second films.

Thereby, the pressure ensures that the liquid is free to move.

According to another aspect of the invention, the outlet/outlets of the recess/recesses is/are placed in the second opening of the second chamber.

According to another aspect of the invention, a packaging material is provided, wherein the channel is V-shaped and the lower area of the V-shaped channel is placed nearer to the bottom of the packaging compared to the rest of the channel.

According to another aspect of the invention, the second film is a high barrier film.

A high barrier film is a film having oxygen barrier properties of less than 1 cm3/m2/24 h/1 atmosphere.

This is measured according to the standard ASTM D 3985 and at the temperature of 23° degrees and 50% relative moisture.

The first film is advantageously also a high barrier film.

The second film need not have flexible properties as is the case with the known valves. Examples of film being suitable are:

Metalized PET laminated to a PE, or an OPP film vacuum coated with silicium oxide or an OPP film coated with EVOH.

The second film may also comprise several layers laminated to each other.

In one embodiment the first chamber and the second chamber may be separated from each other. This means that the first chamber and the second chamber may be positioned in such a way that the first chamber is arranged at a distance from the second chamber, and where the channel is used to provide fluid communication between the two chambers. Thus, by separating the first chamber and the second chamber the two chambers do not overlap, but are positioned in separate areas of the packaging material, where both chambers may be positioned in a volume that is delimited by the first and the second film.

In one embodiment the liquid is adapted to close a fluid communication between the first opening and the second opening by entering an inlet or an outlet of the channel and thereby preventing gasses to pass the channel. The channel may be seen as having a cross sectional diameter or a size, where the cross sectional diameter defines the maximum flow through the channel. The liquid may be adapted to enter the channel, so that the high density liquid closes off a cross sectional diameter of the channel, and which means that the gasses that are present in the first chamber and/or the second chamber cannot bypass the liquid where the pressure of the gasses is limited. However, should the pressure of the gasses inside the first chamber and/or the second chamber increase, the increased pressure will allow the gasses to displace the liquid and push the liquid towards the chamber having lower pressure, and as soon as the liquid has been displaced from the channel, the gasses may pass past the liquid into the opposing chamber. When the pressure has equalized, the equilibrium between the chambers will cause the liquid to enter the channel again and close off the passage between the chambers thereby the liquid Thus, the liquid may be seen as a closing mechanism for the channel and/or the valve.

The invention further comprises a method for producing a packaging material characterised in that the first film is provided with the first opening and that the method comprises the step of applying an adhesive covering a part of said first film said step providing the first chamber and the second chamber and the channel said method further comprising placing the liquid in the first chamber and/or the second chamber/and or the channel and placing a second film covering the adhesive pattern whereby the pressure release valve is provided.

According to another aspect of the invention, the method further comprises the step cutting at least one recess in a specific pattern in the first film in the area where the second film is to be placed, said recess/recesses is/are placed in the channel and the chambers, whereby the recess/recesses connect(s) the first and the second opening.

According to another aspect of the invention, the spacer means are mixed into the liquid before the liquid is applied to the first film or the spacer means are provided by protruding means protruding from the first or the second film.

BRIEF DESCRIPTION OF THE DRAWING(S)

Figure 2:
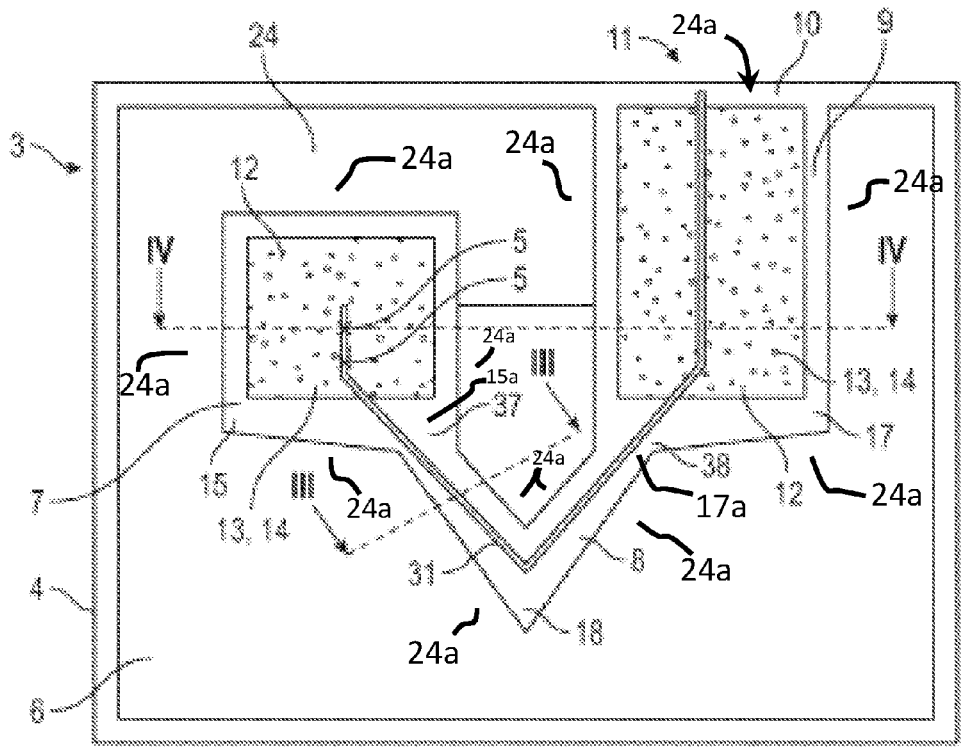
Figure 3:
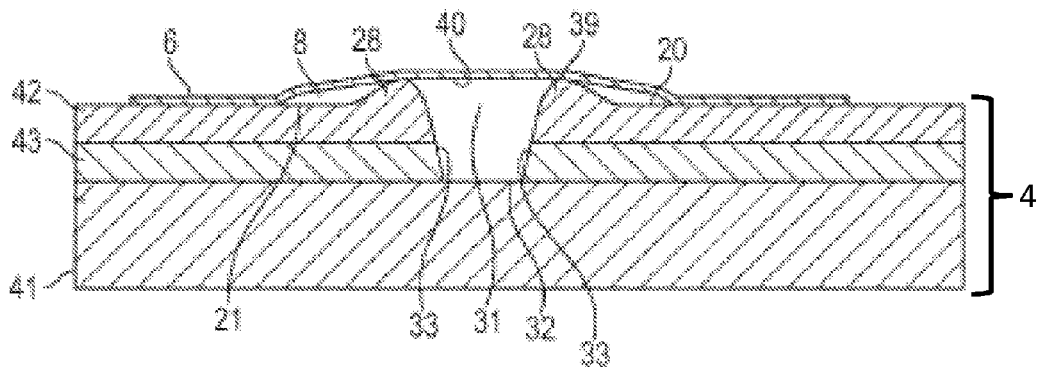
Figure 4:
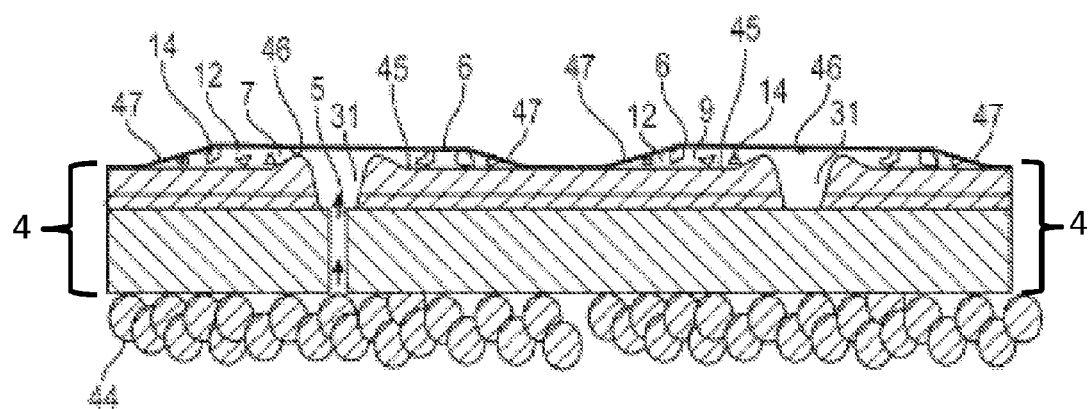
Figure 5:
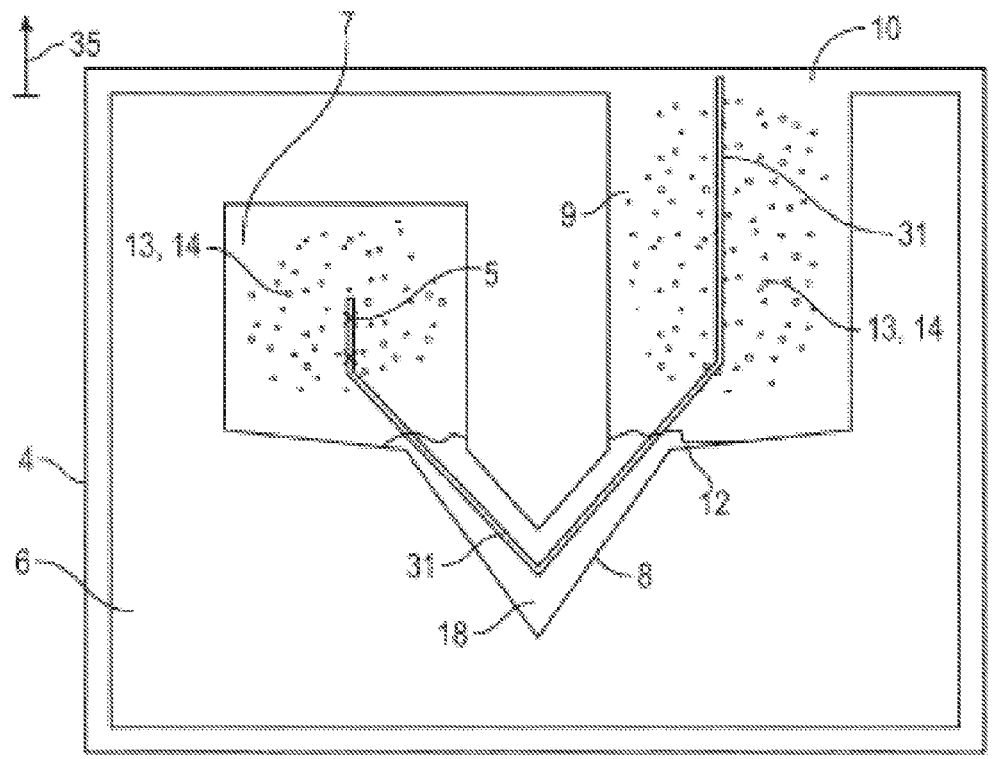

The invention is explained in detail below with reference to the drawing(s), in which FIG. 1 shows a perspective view of a packaging comprising a pressure release valve according to the invention, FIG. 2 shows a section of the packaging comprising a pressure release valve, FIG. 3 shows a cross-sectional view along the line III-Ill in FIG. 2, FIG. 4 shows a cross-sectional view along the line IV-IV in FIG. 2, and FIG. 5 shows the section shown in FIG. 2 after a pressure release has taken place and the liquid in the valve has floated into the channel

DETAILED DESCRIPTION OF THE DRAWINGS

FIG. 1 shows a perspective view of a packaging 2 formed in an appropriate packaging material 1 comprising a film 4 and a pressure release valve 3 according to the invention. The packaging includes a bottom 34 of the packaging 2 and an oppositely placed top 35, where the packaging 2 is opened for access to products inside the packaging 2. The top 35 and the bottom 34 are connected by lateral walls 36. The pressure release valve 3 according to the invention is placed at one of the lateral walls 36, in this case near the top 35 of the packaging 2.

FIG. 2 shows a section of the packaging 2 comprising a pressure release valve 3. The valve 3 comprises first inner film 4, said film 4 enclosing and being in contact with the product inside the packaging 2. An adhesive 24 is placed at the outer surface of the first inner film 4 making a pattern for the valve 3. The adhesive 24 is placed in such a way that the boundary or perimeter 24a of a first chamber 7, a second chamber 9 and a channel 8 connecting the two chambers is formed.

The first chamber 7 is rectangular/square, but may have any form. It comprises a first bottom part 15 (defining a first chamber opening 15a) being the part of the chamber placed closest to the bottom 34 of the packaging 2.

In the middle of the first chamber 7, small openings are provided forming a first opening 5, whereby a gas communication between the interior of the packaging 2 and the first chamber 7 is obtained.

The first film comprises an essentially gas-impervious layer such as a metallisation layer or an EVOH layer and a laminate comprising a polymer selected from groups such as polyolefin, polyamides, polyesters, polypropylene or combination thereof.

The first film could also comprise an aluminium layer or metallization layers in general.

The second chamber 9 is also rectangular/square, but may have any form. It comprises a second bottom part 17 (defining a second chamber opening 17a) being the part of the chamber placed closest to the bottom 34 of the packaging 2. Opposite the second bottom part 17, an outlet opening is provided forming a second opening 10. The outlet opening could also be placed at the vertical sides of the second chamber or by perforation in the second film covering the second chamber. The second opening 10 provides gas communication between the second chamber 9 and the exterior 11 of the packaging 2.

The channel 8 is V-shaped comprising a channel part 18 being the lowermost part of the V-shaped channel. The channel part 18 is placed below the first 15 and the second 17 bottom parts. The channel 8 connects the two chambers 7, 9 and comprises a channel inlet 37 and a channel outlet 38. The channel inlet 37 is connected to the first bottom part 15, and the channel outlet 38 is connected to the second bottom part 17.

In the first 7 and the second 9 chambers, spacer means 13 such as particles 14 are placed. The size of the particles 14 is around 10-100 µm, preferably 40-80 µm The particles are selected from the group consisting of powdered polymer such as polyamide, polyester, silicone or combinations thereof, or minor particles such as silica, carbon, carbon black or mixtures. The purpose of the particles is to ensure a distance between the first film 4 and the second film 6 placed over the first film 4 in the area where the adhesive, the chambers and the channel are placed. The second film 6 forms the "ceiling" in the chambers and thereby, the channel covers the components in question. The second film 6 is laminates selected from groups consisting of polyolefin, polyamides, polyesters, polypropylene or combinations thereof having the size of around 2-6 cm².

Further, the valve 3 comprises a liquid 12 such as oil or water or a combination thereof. Advantageously, the particles are mixed into the liquid and placed in the first 7 and the second 9 chambers. However, the liquid 12 needs to be placed only in the first chamber 7, or the second chamber 9 or the channel 8. The important thing is that the valve 3 comprises enough liquid 12, eg at least 2 µl, to ensure sufficient closure of the one-way valve 3. Then, the easiest way of making the valve is to place the liquid 12, including the particles 14, in both chambers.

The spacer means 13 may also be protrusions placed in the chambers, said spacer means being an integrated part of the films. The spacer means 13 ensures that certain distances between the two films are present during the use of the valve. 3

The channel 8 may have several shapes. It may be W-shaped, straight or curved. However, it should comprise a channel part 18 being at least placed below the second bottom part 17 of the second chamber 9.

In the channel 8, an unbroken, continuous recess 31 is provided, said recess extending from the first opening 5 in the first chamber 7 to the second chamber 9 and further to the second opening 10. The recess 31 is provided by a laser beam or similar and makes a deep gap connection between the two openings 5, 10. The recess 31 increases the possibility of the gas flowing through the valve 3. The liquid 12 ensures that the valve 3 is closed when the excessive pressure inside the packaging has been offset, and the particles 14 ensure that the valve 3 is able to reopen by a small excess opening pressure such as 2-6 mbar.

Advantageously, the liquid 12 is silicon oil containing the small particles. The particles 14 keep the inner and outer film slightly spaced apart, while the silicon oil prevents an open two-way-gas-connection between the first opening and the second opening.

The valve 3 opens when the packed food product generates a specific excess pressure in the first chamber 7 the packaging by. The gas escapes from the first chamber 7 through the inlet opening 37 of the channel 8, through the channel 8 and the outlet 38 of the channel 8 further into the second chamber 9 and further through the second opening 10. Thereby, the inner pressure is reduced, and the valve 3 closes sealably and prevents ambient air from entering the first chamber 7 due to the channel 8 being filled with the liquid 12, thereby providing a sealing impassable by the ambient air.

The valve 3 has the advantage of functioning independently from the material properties. It functions due to the construction as such and the various features incorporated.

Instead of using particles as spacer means, it is possible to use protrusions protruding from the first film or the second film or from both, said protrusions protruding into the chambers in question.

FIG. 3 shows a cross-sectional view along the line III-Ill in FIG. 2 and shows the channel 8 before gas has been released. The channel is provided with at least one recess 31 placed in the middle of the channel 8. The depth of the recess is measured between the bottom wall 32 of the recess and the top of the recess 31. The bottom wall 32 of the recess 31 is below the bottom 21 of the channel 8. The top of the recess is defined as a top 39 of two longitudinal bulbs 28, said longitudinal bulbs 28 running at both sides of the recess 31. The top 39 of the longitudinal bulbs is placed 10-30 µm above the surface 20 of the first film 4.

The recess 31 is extending at least in the entire length of the channel 8. Advantageously, the recess 31 is provided between the first opening 5 and the second opening 10. The recess 31 comprises the bottom wall 32 and the side walls 33 delimiting the recess 31. The distance from the bottom wall 32 of the recess to the top of the bulbs is 20-100 µm, preferably 20-60 µm. The width between the opposite side walls 33 of the recess 31 is 150-300 µm.

At the top 39 of the bulbs 28, the second film 6 is resting against the top 39 with the inner surface 40 of the second outer film 6, or it is a bit spaced from said top.

The first inner film 4 is a laminate comprising a first layer 41 (such as (PE or PP) and a second layer 42 (such as or oriented PET, PP or PA) and therebetween a third layer 43 (such as metalized polyester). The layers are glued to each other.

The inner film may comprise on, two or several layers.

FIG. 4 shows a cross-sectional view along the line IV-IV in FIG. 2 and a cross section of the first 7 and the second 9 chambers. The first chamber 7 is in gas communication with the interior of the packaging through the first opening 5. A product 44 inside the packaging 2 produces gas which escapes the interior of the packaging through said opening 5 and arrives at the first chamber 7. The gas presses the liquid in the first chamber 7 through the channel 8 (not shown). The recess 31 begins at the first opening 5 and continues through the channel 8 and further into the second chamber 9. The chambers 7, 9 are delimited by the first inner film 4 providing a first side 45 in the chambers and by the second outer film 6 providing an oppositely placed second side 46, while the side walls 47 of the chambers 7, 9 are formed by the second outer film 6 adhering to the outer surface of the first film 4. The particles 14 make a space between said films which helps the flow of liquid 12.

FIG. 5 shows the same section as shown in FIG. 2, but after a pressure release has taken place, and the liquid 12 in the valve 3 has floated into the channel 8. The liquid 12 fills the V-shaped channel 8, whereby the ambient air is prevented from entering the interior of the packaging. The spacer means 13, ie particles 14, ensures that a certain distance is formed between the first inner film 4 and the second outer film 6. The particles 14 stay where they are placed; only the liquid 12 flows. The oil runs down into the lowermost part of the channel—eg the channel part 18—and fills it up from there. Thereby, the valve 3 is closed. The arrow denoted 35 shows the position of the top of the packaging.

When a new positive pressure arises inside the packaging, the gas flows out of the first opening into the first chamber, where the particles are present and ensure that the first film and the second film are spaced apart. Then, the gas bobbles through the liquid now placed in the channel, and further into the second chamber, where the particles are present and also ensure that the first and second film are spaced apart. Liquid is pressed into the second chamber by the gas. By this construction, it is possible for the gas to escape the valve even when the excess pressure is quite low, eg around 2-6 mbar. The gas leaves the packaging through the second opening. Now, the liquid flows back into the channel, and the valve is ready again for handling a new excess pressure.

LIST OF REFERENCES

1 packaging material
2 packaging
3 pressure release valve
4 first inner film
5 first opening
6 second outer film
7 first chamber
8 channel
9 second chamber
10 second opening
11 exterior of the packaging
12 liquid
13 spacer means
14 particles or protrusions
15 first bottom part
17 second bottom part
18 channel part
20 surface of the first film
21 bottom
24 adhesive
27 sides of the channel
28 longitudinal bulb
32 recess bottom wall
33 recess walls
34 bottom of the packaging
35 top of the packaging
36 lateraled walls
37 channel inlet
38 channel outlet
39 top of bulbs
40 inner surface of second outer film
41 first layer
42 second layer
43 third layer
44 product
45 first side
46 second side
47 side walls

The invention claimed is:

1. A pressure release valve comprising:
an outer film configured to be coupled to an inner film of a packaging, wherein the inner film defines a first opening, the packaging having an interior configured to hold a product capable of releasing gas, the packaging configured to be placed in an environment, wherein the outer film covers the first opening;
a first chamber defined by the inner film and the outer film, the first chamber being in fluid communication with the interior of the packaging, wherein the first chamber defines a first chamber opening;
a second chamber defined by the inner film and the outer film, wherein the second chamber defines: (a) a second chamber opening; and (b) a second opening in fluid communication with the environment;
a channel defined by the inner film and outer films, wherein the channel extends from the first chamber opening to the second chamber opening so as to fluidly connect the first chamber to the second chamber;
a liquid moveable between the channel and the second chamber; and
at least one spacer positioned within at least one of the first or second chambers,
wherein the first chamber is configured to receive the gas through the first opening and then direct the gas through the first chamber opening and into the channel,
wherein the channel is configured to direct the gas to push the liquid within channel until the liquid is moved into the second chamber to enable the gas to enter the second chamber and escape to the environment through the second opening.

2. The pressure release valve of claim 1, wherein: (a) the first chamber comprises a first bottom end, wherein said first bottom end is adapted to be closer to a bottom of the packaging relative to a second end of the first chamber, and (b) the second chamber comprises a first bottom end, wherein said first bottom end is adapted to be closer to the bottom of the packaging relative to a second end of the second chamber, and (c) the channel fluidly connects the first bottom end of the first chamber to the first bottom end of the second chamber.

3. The pressure release valve of claim 1, wherein a portion of the at least one spacer is mixed in the liquid.

4. The pressure release valve of claim 2, wherein the channel comprises a channel part that is adapted to be placed in an area between the bottom of the packaging and the second bottom end, said channel part being adapted to be placed closer to the bottom of the packaging compared to the placement of the first bottom end of the first chamber and the first bottom end of the second chamber.

5. The pressure release valve of claim 1, wherein the liquid comprises a fluid selected from the group consisting of oil, water, or mixtures.

6. The pressure release valve of claim 1, comprising a plurality of spacers positioned within at least one of the first or second chambers, wherein: (a) each of the spacers comprises a particle selected from the group consisting of a particle comprising powdered polymer, a particle comprising polyamide, a particle comprising polyester, a particle comprising silicone, a silica particle, a carbon particle, a carbon black particle, or a mixture thereof; and (b) a size of the particle is within a range of 10-100 µm in diameter.

7. The pressure release valve of claim 1, wherein the channel comprises at least one recess extending a portion of a length of the channel, said recess comprising a bottom wall, and a top wall.

8. The pressure release valve of claim 7, wherein the top wall of the at least one recess is defined by at least one longitudinal bulb extending along at least one side of the recess.

9. The pressure release valve of claim 1, wherein the inner film comprises a material selected from the group consisting of metallization layer or an EVOH layer.

10. The pressure release valve of claim 9, wherein the outer film comprises a material selected from the group consisting of metallization layer or an EVOH layer.

11. The pressure release valve of claim 1, wherein both the first chamber and the second chamber contain the liquid, wherein the pressure release valve includes a plurality of spacers in contact with the liquid.

12. The pressure release valve of claim 11, wherein, the spacers maintain a distance between the inner film and the outer film.

13. The pressure release valve of claim 1, wherein the channel contains a portion of the liquid when the liquid is forced into the channel by the gas.

14. The pressure release valve of claim 1, wherein the liquid is great enough in volume to close a fluid communication between the first opening and the second opening by continuously residing either within the channel or within the second chamber covering the second chamber opening, thereby closing the fluid communication and preventing gas to pass from the environment into the first opening.

15. A valve device comprising:
an inner layer defining a first opening, the inner layer configured to be connected to a package, the package having an interior configured to hold a product capable of releasing gas, the package configured to be placed in an environment;
an outer layer coupled to the inner layer, the outer layer defining a second opening in fluid communication with the environment;
a chamber assembly positioned at least partially between the inner and outer layers, the chamber assembly comprising:
  a first chamber defining: (a) a first chamber space in fluid communication with the first opening; and (b) a first chamber opening, wherein the first chamber comprises a first perimeter that surrounds the first chamber space; and
  a second chamber in fluid communication with the second opening, wherein the second chamber defines: (a) a second chamber space; and (b) a second chamber opening, wherein the second chamber comprises a second perimeter that surrounds the second chamber space;
  a channel defining: (a) a first channel opening fluidly connected to the first chamber opening; and (b) a second channel opening fluidly connected to the second chamber opening, wherein the channel extends from the first chamber opening to the second chamber opening;
a liquid moveable between the channel and wherein the liquid comprises a volume great enough to fill at least a portion of the channel; and
at least one spacer positioned within a portion of the chamber assembly, wherein the valve device is configured to enable the released gas to travel:
  (a) from the interior, through the first opening and to the first chamber,
  (b) from the first chamber into the channel until the released gas moves the liquid from the channel to the second chamber, thereby enabling the released gas to enter into the second chamber; and
  (c) from the second chamber, through the second opening and to the environment, and
wherein the liquid enables the released gas to escape to the environment while blocking environmental gas of the environment from entering into the interior so as to help to maintain freshness of the product.

16. The valve device of claim 15, comprising:
an adhesive pattern that forms the first perimeter, the second perimeter and boundaries of the channel; and
a plurality of spacers positioned between the inner layer and the outer layer;
wherein the channel comprises a first end connected to the first chamber, a second end connected to the second chamber, and an intermediate portion between the first and second ends, wherein the first end intersects with a first horizontal plane, the second end intersects with a second horizontal plane and the intermediate portion intersects with a third horizontal plane that is located below the first and second horizontal planes when the package is vertically oriented upright.

17. The valve device of claim 15, wherein:
the spacers are movable relative to the chamber assembly; and
the spacers are configured to be suspended within the liquid.

18. The valve device of claim 17, which includes a pressure threshold associated with the liquid, wherein the pressure threshold enables the released gas to escape from the interior while preventing the environmental gas from entering into the interior.

19. The valve device of claim 15, wherein the volume of the liquid is great enough to fill the channel and portions of the first and second chambers.

20. A food packaging valve device comprising:
an inner layer defining a first opening, the inner layer configured to be connected to a package, the package having an interior configured to hold a food product capable of releasing gas, the package configured to be placed in an environment;
an outer layer coupled to the inner layer, the outer layer defining a second opening;
a chamber assembly positioned at least partially between the inner and outer layers, the chamber assembly comprising:
  a first chamber in fluid communication with the first opening, the first chamber comprising a first chamber portion defining a first enclosed cavity and a first chamber opening; and
  a second chamber in fluid communication with the second opening, the second chamber comprising a second chamber portion defining a second enclosed cavity and a second chamber opening;
a channel fluidly connecting the first chamber to the second chamber, wherein the channel extends from the first chamber opening to the second chamber opening;
a liquid great enough in volume to occupy at least the channel and at least a portion of the second enclosed cavity; and a plurality of spacers configured to be suspended within the liquid, wherein each one of the spacers is configured to move relative to the chamber assembly, wherein the food packaging valve device is configured to enable the released gas to travel:
(a) from the interior, through the first opening and atoll into the first enclosed cavity,
(b) from the first enclosed cavity, through the first chamber opening and into the channel until the released gas drives the liquid out of the channel, through the second chamber opening and into the second enclosed cavity; and
(c) from the second enclosed cavity, through the second opening and to the environment, and wherein the liquid enables the released gas to escape into the environment after the released gas exceeds a pressure threshold to entirely pass through the liquid in the second enclosed cavity, wherein the liquid blocks entry of environmental gas of the environment into the interior as long as the environmental gas has a pressure below the pressure threshold, wherein the blocking of the environmental gas helps to maintain freshness of the food product.

\* \* \* \* \*